United States Patent
Berstis

(10) Patent No.: US 6,337,688 B1
(45) Date of Patent: Jan. 8, 2002

(54) METHOD AND SYSTEM FOR CONSTRUCTING A VIRTUAL REALITY ENVIRONMENT FROM SPATIALLY RELATED RECORDED IMAGES

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,925

(22) Filed: Jan. 29, 1999

(51) Int. Cl.[7] ............................................. G06T 15/70
(52) U.S. Cl. ..................................................... 345/473
(58) Field of Search ................................. 345/427, 473, 345/121, 419

(56) References Cited

U.S. PATENT DOCUMENTS

| | | |
|---|---|---|
| 5,245,537 A | 9/1993 | Barber |
| 5,406,489 A | 4/1995 | Timothy et al. |
| 5,617,317 A | 4/1997 | Ignagni |
| 5,774,832 A | 6/1998 | Vandewerf |
| 5,821,945 A * | 10/1998 | Yeo et al. .................... 345/440 |
| 5,850,352 A * | 12/1998 | Moezzi et al. ............... 364/514 |
| 5,880,775 A * | 3/1999 | Ross ........................... 348/143 |
| 5,881,321 A * | 3/1999 | Kivolowitz ................... 396/53 |
| 5,956,660 A | 9/1999 | Neumann |
| 6,054,991 A * | 4/2000 | Crane et al. ................. 345/420 |
| 6,104,406 A * | 8/2000 | Berry et al. ................. 345/427 |
| 6,151,028 A * | 11/2000 | Kumagai et al. ............ 345/427 |
| 6,195,122 B1 * | 2/2001 | Vincent ....................... 348/169 |

\* cited by examiner

Primary Examiner—Mark Zimmerman
Assistant Examiner—Enrique L Santiago
(74) Attorney, Agent, or Firm—Jeffrey S. LaBaw; Bracewell & Patterson, L.L.P.

(57) ABSTRACT

A simulation of a real environment is constructed from a series of recorded frames that each contain an image of the real environment and each have data recording the associated position and orientation within the real environment. The series of image frames is first grouped into frame groups so that each frame group includes only recorded frames that have closely spaced associated positions. Logical links are then created between neighboring frame groups, where the logical links are indicative of navigation paths permitted during simulation between positions associated with the frame groups thus linked. The environment is then simulated by displaying a recorded frame belonging to a current frame group. In response to an input specifying a desired movement within the simulation, a recorded frame from a neighboring frame group of the current frame group is displayed instead.

14 Claims, 7 Drawing Sheets

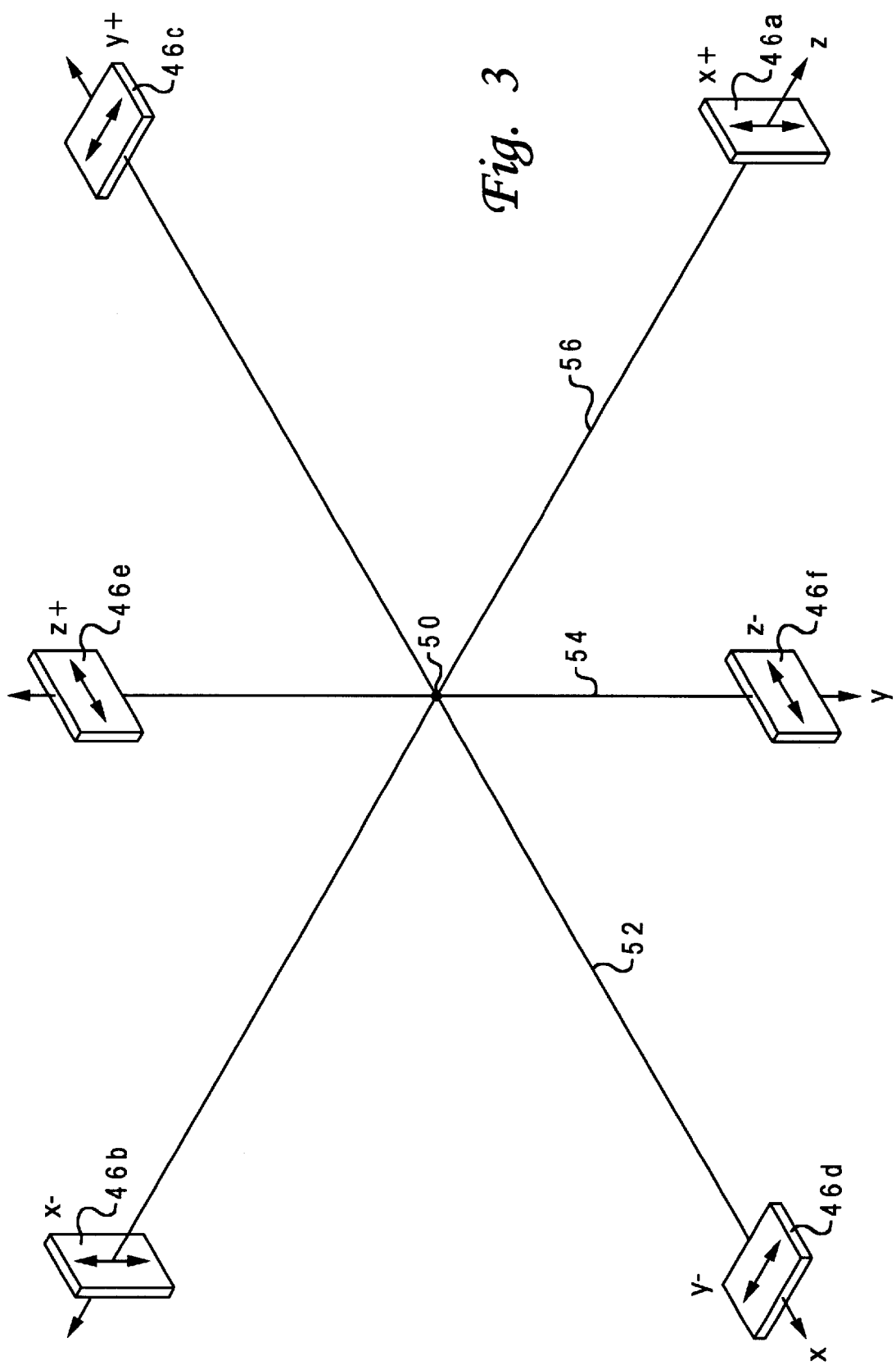

| PATH OR POSITION | FORWARD | BACKUP | REVERSE VIEW | CHOOSE ANGLE OF ROTATION | CHOOSE FROM MULTIPLE PATHS |
|---|---|---|---|---|---|
| A | • | | | | |
| A ↔ B | • | • | • | | |
| B | • | • | • | PARTIAL | • |
| B ↔ C | • | • | • | | |
| C | • | • | • | FULL | |
| B ↔ D | • | • | • | | |
| D | • | • | • | PARTIAL | • |
| D ↔ E | • | • | • | | |
| E | • | • | • | FULL | |
| D ↔ F | • | • | • | | |
| F | • | • | • | PARTIAL | • |
| F → G | • | • | | | |
| G | • | • | | | |
| G → H | • | • | | | |
| H | • | • | • | PARTIAL | • |
| H ↔ I | • | • | • | | |
| I | • | • | • | FULL | |
| H → E | • | • | | | |
| F ↔ J | • | • | • | | |
| J | • | • | • | PARTIAL | • |
| J ↔ K | • | • | • | | |
| K | • | • | • | FULL | |
| J ↔ L | • | • | • | | |
| L | • | • | • | FULL | |

*Fig. 9*

METHOD AND SYSTEM FOR CONSTRUCTING A VIRTUAL REALITY ENVIRONMENT FROM SPATIALLY RELATED RECORDED IMAGES

CROSS-REFERENCE TO RELATED APPLICATION

This application is related to the subject matter of co-pending application Ser. No. 09/240,925, entitled "Method and System for Determining Position Information Utilizing a Portable Electronic Device Lacking Global Positioning System (GPS) Reception Capability," which is filed on even date herewith and incorporated herein by reference.

BACKGROUND OF THE INVENTION

1. Technical Field

The present invention relates in general to graphics processing and, in particular, to a method and system for developing a virtual reality environment. Still more particularly, the present invention relates to a method and system for constructing a virtual reality environment from spatially related images.

2. Description of the Related Art

In many application programs that generate computer graphics, it is desirable to provide views of virtual environments. For example, many computer-aided design (CAD) and space planning programs can automatically generate an elevation view of an interior space based upon a floorplan and other information input by a user. By displaying various user-selected elevation views of the interior space, these programs permit the user to simulate a "tour" of the interior space. Although such programs are often characterized by ease of use and do convey some understanding of the visual impression of a real environment selected for simulation, these programs frequently fail to offer highly realistic views of the selected environment.

There is another class of graphics application programs, for example, computer games, that frequently generate highly detailed and realistic views of a virtual environment. Programs within this second class tend to be computationally-intensive, and to produce them requires specialized programming skills and training beyond those of the average end user. And despite the realism of the resulting graphics, these programs do not permit the accurate representation of real environments, such as the Grand Canyon, which are not easily described in mathematical terms.

SUMMARY OF THE INVENTION

The present invention overcomes the foregoing and other shortcomings in the art by providing a method and system that permit a user lacking specialized programming skills and training to produce a realistic simulation of a real environment.

According to the present invention, a simulation of a real environment is constructed from a series of recorded frames that each contain an image of the real environment and each have stored data specifying the associated position and orientation within the real environment. The series of image frames is first grouped into frame groups so that each frame group includes only recorded frames that have closely spaced associated positions. Logical links are then created between neighboring frame groups, where the logical links are indicative of navigation paths permitted during simulation between positions associated with the frame groups thus linked. The environment is then simulated by displaying a recorded frame belonging to a current frame group. In response to an input specifying a desired movement within the simulation, a recorded frame from a neighboring frame group of the current frame group is displayed instead.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 illustrates a more detailed block diagram of a preferred embodiment of position and orientation sensor 34 of FIG. 2;

FIG. 9 is a chart summarizing the linear and rotational movements permitted at various simulated positions within the virtual reality environment described by the data structure illustrated in FIG. 7.

DETAILED DESCRIPTION OF ILLUSTRATIVE EMBODIMENT

Figure 1:
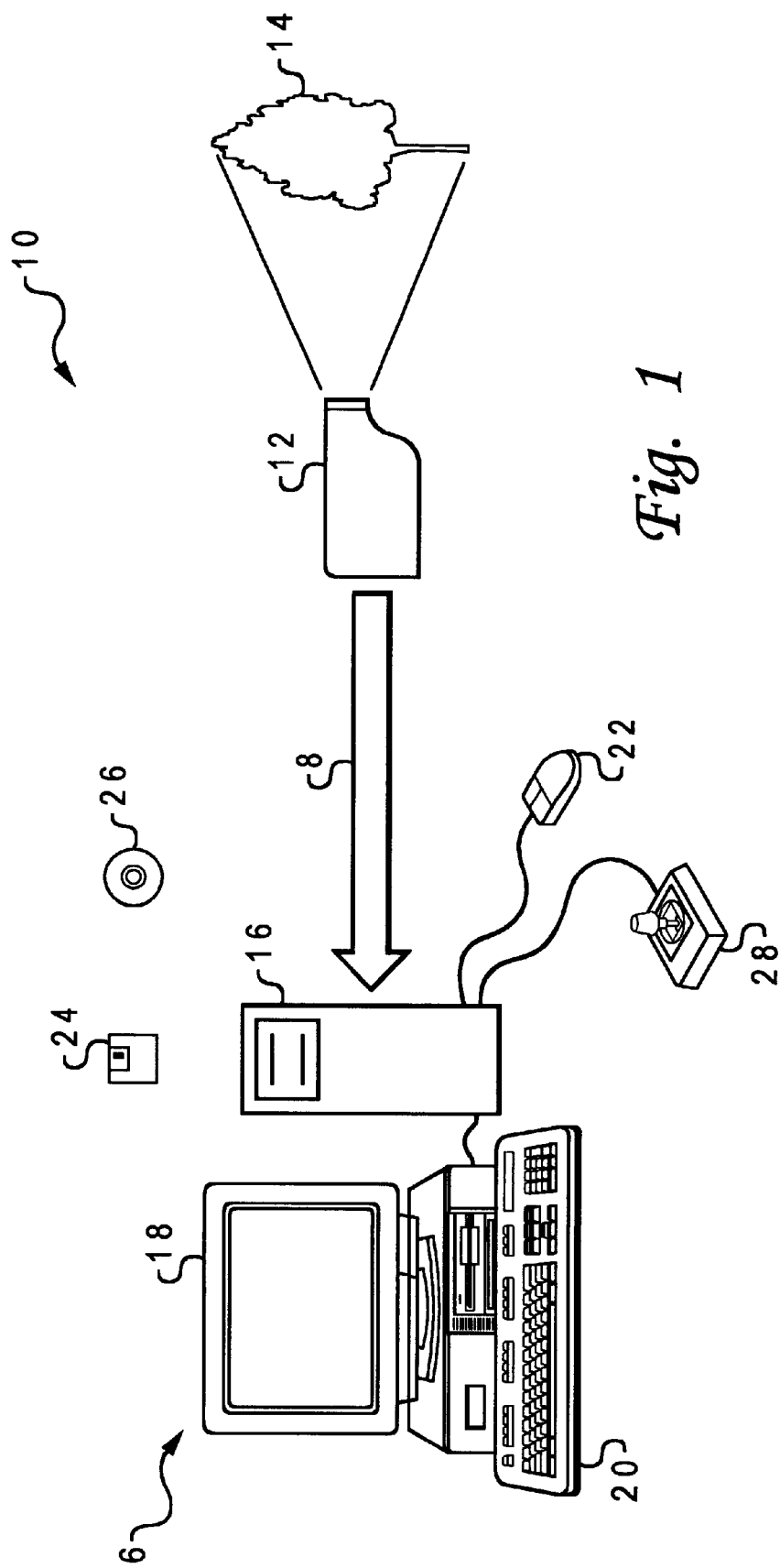
FIG. 1 depicts an illustrative embodiment of an image processing system that may advantageously be utilized to implement the present invention.

With reference now to the figures and in particular with reference to FIG. 1, there is depicted an illustrative embodiment of an image processing system that may be utilized to create and present a virtual reality environment utilizing spatially related recorded images in accordance with the present invention. As illustrated, image processing system 10 includes a computer system 6 and an image capture device, such as camera 12. In the depicted embodiment, computer system 6 is a multimedia personal computer system such as one of the Aptiva series manufactured by International Business Machines Corporation of Armonk, N.Y. As such, computer system 6 includes a system unit 16 having data storage and processing capabilities, a keyboard 20, mouse 22, and joystick 28 for receiving user inputs, and a display 18 for presenting graphical outputs. In accordance with the present invention, the graphical outputs that may be presented within display 18 include simulations of real environments.

Camera 12 is utilized to record images of a surrounding environment (e.g., tree 14) to be simulated. In a preferred embodiment, camera 12 is a digital video camera that captures a sequence of discrete frames at a sufficiently high frame rate to obtain full-motion video and that records such frames in digital format within a data storage medium (e.g., a magnetic or optical disk). In alternative embodiments of the present invention, camera 12 can be implemented as a digital still camera or as a conventional video camera that records analog video images on video tape.

As indicated by arrow 8, the frames recorded by camera 12 can be input into system unit 16 of computer system 6 for image processing, such as that described below with respect to FIGS. 6 and 8. The transfer of frames from camera 12 to system unit 16 can be accomplished in a variety of ways, depending upon the format in which the frames were recorded by camera 12. If the frames were recorded in analog video format, the recorded frames are preferably transferred via a wired or wireless video connection. Digital image data may be transferred to system unit 16 via removable storage media, such as floppy disk 24 and optical disk 26, or via a wired or wireless data link. Analog image data received by system unit 16 are preferably converted to digital format utilizing a conventional analog-to-digital conversion technique prior to further image processing.

Figure 2:
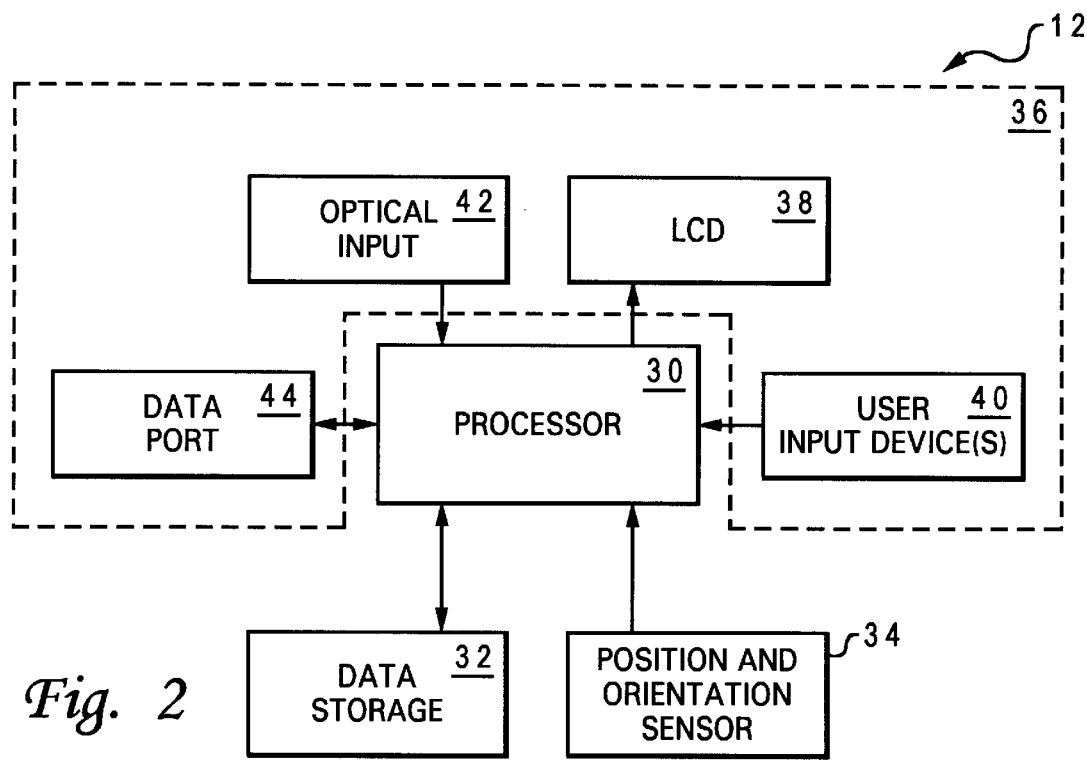
FIG. 2 depicts a block diagram of an illustrative embodiment of the camera shown in FIG. 1.

Referring now to FIG. 2, there is illustrated a high level block diagram of a preferred embodiment of camera 12 in which camera 12 is a digital video camera. Camera 12 includes processor 30, which comprises a general or special-purpose processor operable in response to program instructions (e.g., contained within data storage 32). In an alternative embodiment, the functions of processor 30 can be implemented by logic circuitry that controls the operation of camera 12 without the direction of program instructions. Processor 30 is coupled to data storage 32, position and orientation sensor 34, and a number of input/output (I/O) devices 36.

Data storage 32 can be implemented with any one or a combination of data storage technologies, including removable storage (e.g., PCMCIA cards and optical and floppy disks), volatile resident storage (e.g., DRAM), and non-volatile resident storage (e.g., NVRAM and hard disk). In addition to storage for recorded images and program instructions, data storage 32 contains storage for position and orientation information for camera 12 that may be expressed, for example, using three-dimensional cartesian coordinates (x,y,z) and roll ($\theta_X$), pitch ($\theta_Z$), and yaw ($\theta_Y$).

During operation, camera 12 continuously senses the position and orientation of optical input 42 utilizing position and orientation sensor 34. Although position and orientation sensor 34 may also include a Global Positioning System (GPS) receiver, position and orientation sensor 34 is preferably implemented with inertial sensors that permit camera 12 to sense positional changes without directly receiving externally-generated (e.g., (GPS)) position information. Inertial sensors that may be employed include piezoelectric gyroscopes, which detect motion in response to a disturbance in the planar oscillation of a piezoelectric crystal, and silicon chip accelerometers, such as the ADXL202 produced by Analog Devices of Santa Clara, Calif. Both of these types of inertial sensors are commercially available at low cost relative to a GPS receiver.

Still referring to FIG. 2, I/O devices 36 include a liquid crystal display (LCD) 38 that can display a variety of images, including text, graphics, and compound images including both text and graphics. When camera 12 is in a capture mode, LCD 38 preferably displays the image that optical input 42 is currently capturing and recording within data storage 32. Alternatively, when camera 12 is in a playback mode, LCD 38 displays selected recorded images from data storage 32. Camera 12 may also advantageously display within LCD 38 a menu or similar presentation of textual or graphical (E.g., iconic) selections that may be selected via user input devices 20 in order to identify a desired mode of operation. I/O devices 18 preferably further include a data port 44 for communicating images and other data via a wireless (e.g., RF or IR) or wired connection with computer system 6.

Referring now to FIG. 3, there is illustrated a more detailed block diagram of a preferred embodiment of position and orientation sensor 34 in which silicon chip accelerometers are utilized to detect movement of camera 12. As shown, position and orientation sensor 34 preferably include at least 6 accelerometers, including X+, X−, Y+, Y−, Z+, and Z− accelerometers 46a–46f, respectively. Pairs of accelerometers 46 are equally spaced about an origin point 50 along each of three (imaginary) orthogonal axes (i.e., X axis 52, Y axis 54, and Z axis 56), and each accelerometer 46 detects acceleration orthogonal to its associated axis in the indicated direction. That is, X+ and X− accelerometers 46a and 46b detect acceleration orthogonal to X axis 52 and Z axis 56 and parallel to Y axis 54, Y+ and Y− accelerometers 46c and 46d detect acceleration orthogonal to Y axis 54 and X axis 52 and parallel to Z axis 56, and Z+ and Z− accelerometers 46e and 46f detect acceleration orthogonal to Z axis 56 and Y axis 54 and parallel to X axis 52. When camera 12 is operating, each of accelerometers 46 supplies processor 30 with a continuous stream of acceleration data indicative of its measured acceleration.

As will appreciated by those skilled in the art, processor 30 can then compute the velocity, relative orientation, and change in position of camera 12 based upon the acceleration data received from accelerometers 46 utilizing basic mathematical relations. For example, if the acceleration measured by X+ accelerometer 46a is $a_{X+}$, $$\int a_{X+} = v_{X+}$$

and $$\int v_{X+} = d_{X+}$$

where $v_{X+}$ and $d_{X+}$ are the velocity and distance traveled, respectively, of X+ accelerometer 46a. In addition, the angular acceleration of X+ accelerometer 46a ($\alpha_{X+}$) can be determined from $a_{X+}$ and the known distance (R) of X+ accelerometer 46a from origin 50 according to the equation $\alpha_{X+} = a_{X+}/R$. The quantity $\alpha_{X+}$ can then be integrated once to determine the angular velocity $\omega_{X+}$ and twice to determine the angle of rotation $\theta_{X+}$ as follows:

$$\int \alpha_{X+} = \omega_{X+}$$

and $$\int \omega_{X+} = \theta_{X+}$$

Once the linear quantities for each accelerometer 46 are determined, the linear distance camera 12 has traveled from origin 50 along each axis can be determined from the following relations:

$$d_X = d_{Z+} + d_{Z-}$$

$$d_Y = d_{X+} + d_{X-}$$

$$d_Z = d_{Y+} + d_{Y-}$$

Similarly, the angular increment that camera 12 has rotated about each of axes 52, 54, and 56, is given by the following relations:

$$\theta_X = \theta_{X+} - \theta_{X-} \text{ (roll)}$$

$$\theta_Y = \theta_{Y+} - \theta_{Y-} \text{ (yaw)}$$

$$\theta_Z = \theta_{Z+} - \theta_{Z-} \text{ (pitch)}$$

Figure 4:
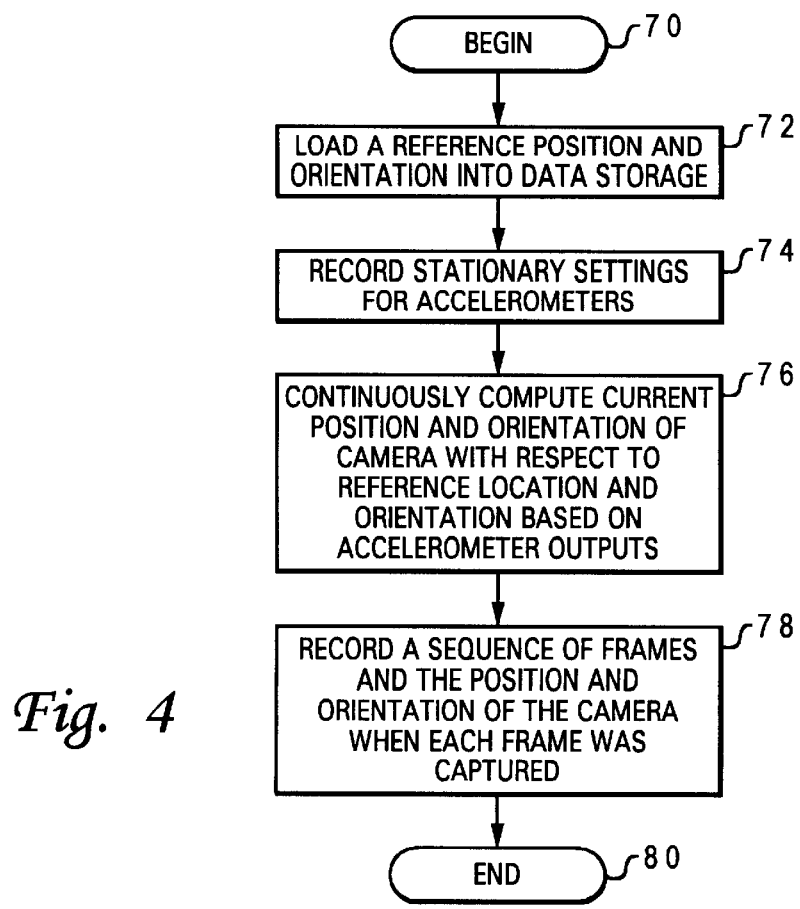
FIG. 4 is a high level logical flowchart of a method of recording images of a real environment in conjunction with position information utilizing the camera depicted in FIGS. 1 and 2.

With reference now to FIG. 4, there is illustrated a high level logical flowchart of a method of recording images in conjunction with position information utilizing camera 12 of FIGS. 1 and 2. As depicted, the process begins at block 70 and thereafter proceeds to block 72, which illustrates camera 12 loading a reference position and reference orientation into data storage 32 of camera 12. In embodiments in which camera 12 lacks an on-board GPS receiver, block 72 preferably entails camera 12 deeming the initial camera position and orientation within the environment to be simulated as the position origin ((x,y,z)=(0,0,0)) and the reference orientation (($\theta_X$, $\theta_Y$, $\theta_Z$)=(0,0,0)) in response to a selected user input. If camera 12 is capable of receiving a GPS input (e.g., from an on-board or separate GPS receiver), the reference position loaded at block 72 can comprise the longitude, latitude, and altitude of any arbitrary location.

The initialization of camera 12 continues at block 74, which depicts processor 30 recording within data storage 32 the stationary output values of each of accelerometers 46 either automatically or in response to a user input. These stationary output values calibrate camera 12 and permit processor 30 to thereafter accurately determine the various linear and angular accelerations.

Next, the process proceeds from block 74 to block 76, which illustrates processor 30 continuously computing the current location and current orientation of camera 12 relative to the reference position and orientation stored within data storage 32 utilizing the outputs of accelerometers 46. The relative current location and relative current orientation are preferably derived utilizing the equations detailed above.

Once camera 12 has been initialized as shown at blocks 72 and 74 and has begun to compute its current relative position and relative orientation as depicted at block 76, the process proceeds to block 78. Block 78 illustrates camera 12 recording a sequence of frames within data storage 32. Importantly, in association with each frame, camera 12 also records within data storage 32 the current relative position and current relative orientation of camera 12 at the moment the associated frame was captured. This position and orientation information can either be stored as part of the image (e.g., MPEG (Moving Pictures Experts Group) or JPEG (Joint Pictures Experts Group)) file itself or separately (e.g., in association with a "frame" number). If the position and orientation information is stored as part of an MPEG image file, the position and orientation information can conveniently be encoded within the MPEG image file as closed captioning text. After images of all desired views of the environment to be simulated have been captured, the image capture process shown in FIG. 4 terminates at block 80.

Figure 5:
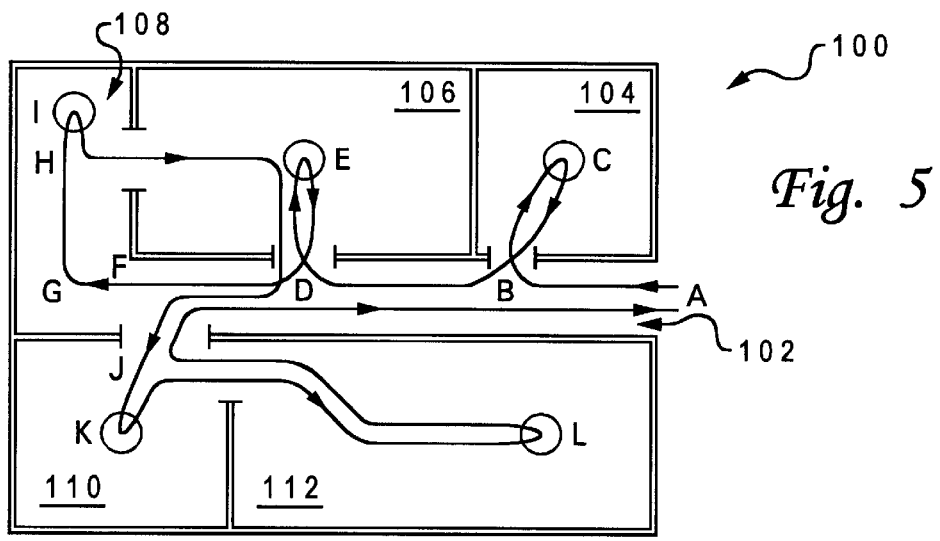
FIG. 5 is an exemplary plan view of the interior space of a building that is to be simulated in accordance with the present invention.

Referring now to FIG. 5, there is illustrated a plan view of an exemplary building interior that may be simulated by a virtual reality presentation produced and presented in accordance with the present invention. As shown, building 100 includes a central hallway 102 surrounded by a number of rooms 104–112. Also illustrated in FIG. 5 is an exemplary path that a user may follow when capturing images of the interior according to the method of FIG. 4. As noted above, the images may be captured by a digital still camera or an analog or digital video camera at intervals along the illustrated path. Positions of particular interest along the path, which are labelled for convenience with capital letters A–L, are visited during image capture in the following order:: A, B, C, B, D, E, D, F, G, H, I, H, E, D, F, J, K, J, L, J, F, D, B, A. As indicated in FIG. 5 by circles, at positions C, E, I, K and L images are captured over a 360° (yaw) range.

Figure 6:
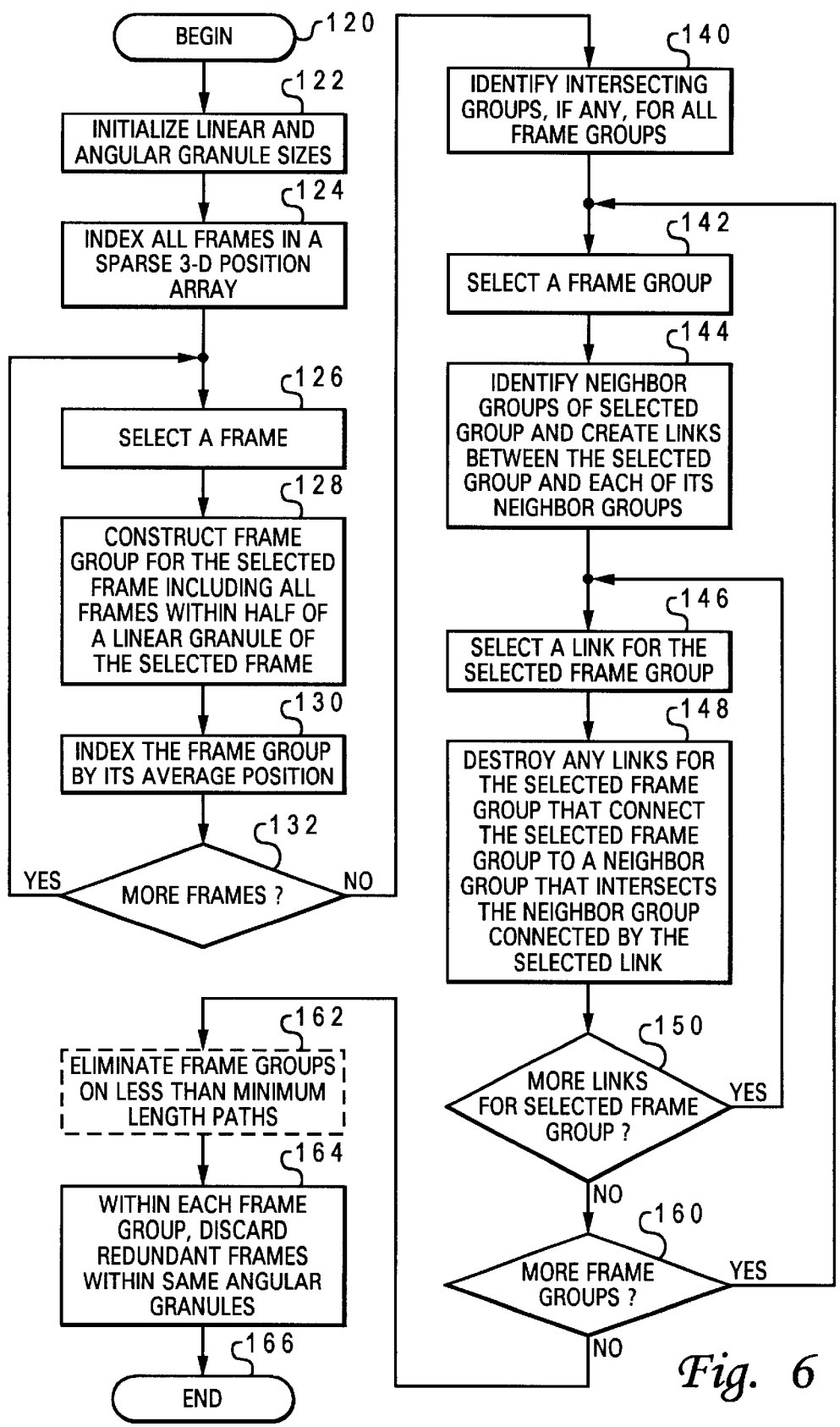
FIG. 6 depicts a high level logical flowchart of a process for generating a presentation data structure utilized in the presentation of a virtual reality environment.

With reference now to FIG. 6, there is depicted a high level logical flowchart of an automated process for processing spatially related recorded images (e.g., those of the interior of building 100) to produce a presentation data structure utilized to present a virtual reality environment in accordance with the present invention. The process shown in FIG. 6 can be performed, for example, by computer system 6 under the direction of program instructions or by a special-purpose processing system.

The process depicted in FIG. 6 begins at block 120 in response to designation of a set of spatially related frames containing images of a real environment to be simulated. The frame set may reside, for example, within the non-volatile data storage of computer system 6 in MPEG or JPEG format. Next, at block 122, linear and angular granule sizes are initialized either by the user or in an automated fashion. These granule sizes specify the minimum range of linear and rotational motion that will be permitted by the simulation. Thus, if the distance between two locations at which individual frames were captured is less than the linear granule size, the images will be treated as though they were captured at the same location. Similarly, if the camera orientations of two frames captured within the same linear granule differ by less than the angular granule size, the frames will be deemed to have the same orientation. Typical ranges of linear and angular granule sizes are between 1 and 3 feet (approximately 0.6–1.0 m) and between 10° and 30°, respectively. The granule sizes are preferably, although not necessarily, the same for each of the three linear directions (x,y,z) and for the three angular directions (roll, pitch, yaw).

The process proceeds from block 122 to block 124, which depicts indexing all frames within the frame set in a sparse 3-D position array. The construction of this array permits further processing steps to efficiently access the frames and their positions in three-dimensional space. Each of the captured frames is then processed in turn, as depicted at blocks 126–132. A frame is first selected for processing at block 126. Then, as shown at block 128, a frame group for the selected frame is constructed by including within the frame group all frames captured at positions within half of a linear granule of the position of the selected frame. In other words, the cartesian coordinates associated with the selected frame can be thought of as the center of a sphere having a diameter equal to the linear granule size, and all frames having associated positions falling within the sphere are placed in the selected frame's frame group. After the frame group for the selected frame has been constructed, an average (x,y,z) position for the frame is calculated and stored at block 130. If additional frames remain unprocessed, the process passes to block 132 and returns to block 126, where a next frame is selected for processing. However, if all frames in the frame set have been processed, the process proceeds through decision block 132 to block 140.

At block 140, the other frame groups, if any, that intersect each frame group are identified. Frame groups are defined as intersecting if the frame groups share at least one frame in common. The process then proceeds from block 140 to blocks 142–160, which illustrate processing steps performed for each frame group. A frame group is first selected for processing at block 142. Next, at block 144, the neighbor groups of the selected frame group are identified, where a neighbor group is defined as a frame group that: (1) intersects a intersecting group of the selected group, (2) does not itself intersect the selected group, and (3) is the positionally closest such frame group to the selected frame group for that particular intersecting group. As is further illustrated at block 144, logical links between the selected frame group and each of its neighbor groups are then created. As discussed below, these links permit the virtual reality presentation to simulate motion by traversing between linked frame groups. The links created for the selected frame group are then processed at blocks 146–150.

Block 146 illustrates the selection of a link of the selected frame group. The process then proceeds to block 148, which depicts destroying any links of the selected frame group that connect the selected frame group to a neighbor group that intersects the neighbor group connected to the selected frame group by the selected link. The reduction of links in this manner eliminates substantially redundant paths so that the paths that may be traversed in the virtual reality presentation are reduced to a reasonable number. If additional links of the selected frame group remain to be processed, the process passes through block 150 and returns to block 146, which has been described. Alternatively, if all links of the selected frame group have been processed, a determination is made at block 160 whether or not all of the frame groups have been processed. If not, the process returns to block 142, which illustrates the selection of a next frame group to be processed. If, however, all frame groups have been processed, the process proceeds from block 160 to block 162.

Block 162 depicts an optional step in which less-than-minimal-length paths of traversal in the virtual reality presentation are eliminated by discarding the frame groups in such paths. By eliminating dead-end paths that deviate from an established direction of path traversal, navigation in the simulated environment is simplified, and the realism of the simulation is enhanced. The process then passes to block 164, which illustrates discarding from each frame group redundant frames having orientations falling within the same angular granule. The redundant frames to be discarded can be selected based upon a number of parameters, including the amount of contrast in the frames, the focus quality, etc. Discarding redundant frames in this manner advantageously reduces the storage requirement of the virtual reality presentation and guarantees that the view presented at a given simulated position and orientation will always be consistent. Following block 164, the image processing process depicted in FIG. 6 terminates at block 166.

The final product of the image processing process shown in FIG. 6 is a presentation data structure specifying links between frame groups, which as noted above represent possible navigation paths within a virtual reality presentation. As will be appreciated by those skilled in the art, the presentation data structure may be implemented utilizing any of a number of data structure types, including linked list, etc. Regardless of the particular type of data structure that is utilized, the data structure may be represented as shown in FIG. 7, which illustrates the frame groups and links resulting from processing the image data captured in FIG. 5 according to the image processing process depicted in FIG. 6.

Figure 7:
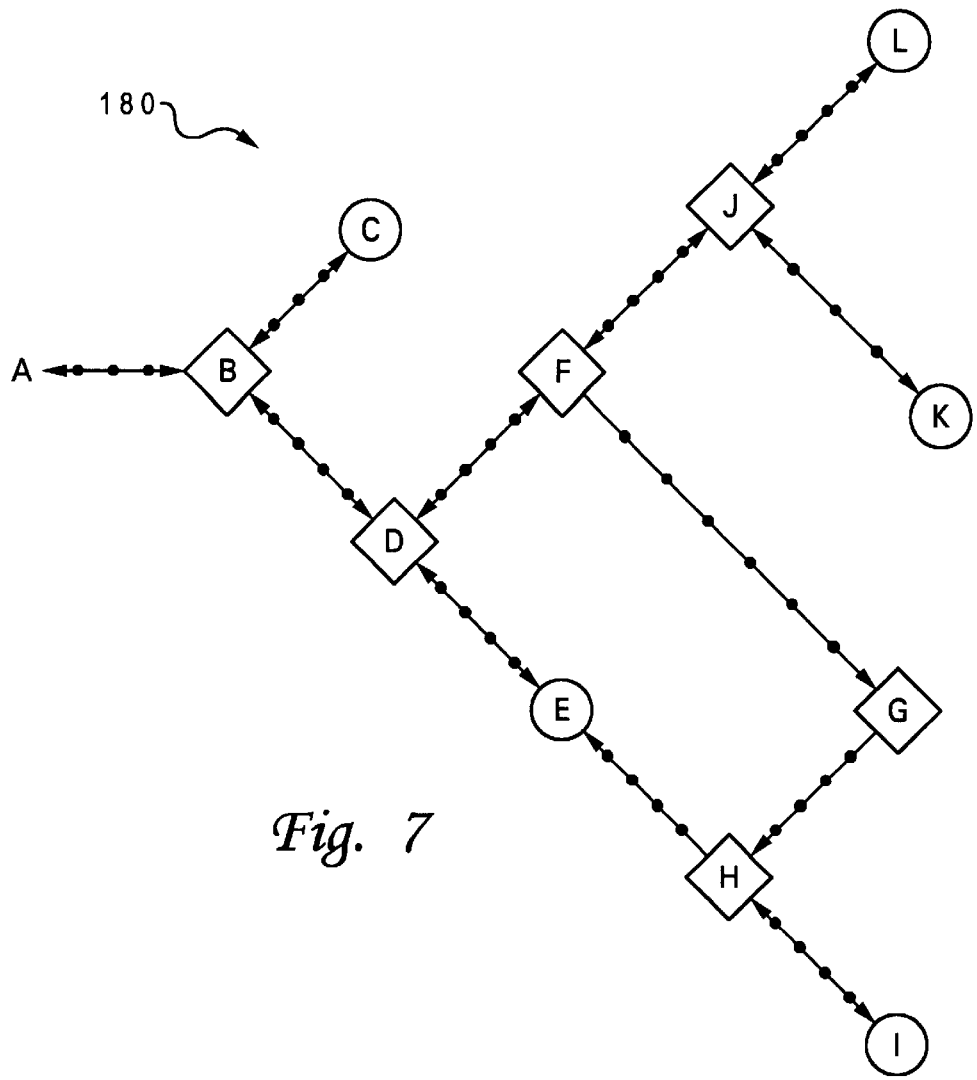
FIG. 7 is a representation of a presentation data structure produced by the process shown in FIG. 6 from images captured within the building shown in FIG. 5.

In FIG. 7, frame groups within a presentation data structure 180 are illustrated as points (•) and also with capital letters corresponding to the associated position of interest (e.g., A, B, etc.). Links between frame groups are illustrated as line segments. An arrow terminating a line segment indicates a direction that the path between the positions associated with the frame groups can be traversed during simulation. Thus, if a line segment is terminated at each end by an arrow, the corresponding path can be traversed in both directions during simulation. Finally, frame groups containing frames that provide a 360⁻ view from the associated position (e.g., C and E) are illustrated with circles, and frame groups containing frames capable of providing more than a forward and reverse view are depicted with diamonds (e.g., B and D). FIG. 9 summarizes the linear and rotational movements permitted at various simulated positions within the virtual reality environment described by the data structure illustrated in FIG. 7.

Figure 8:
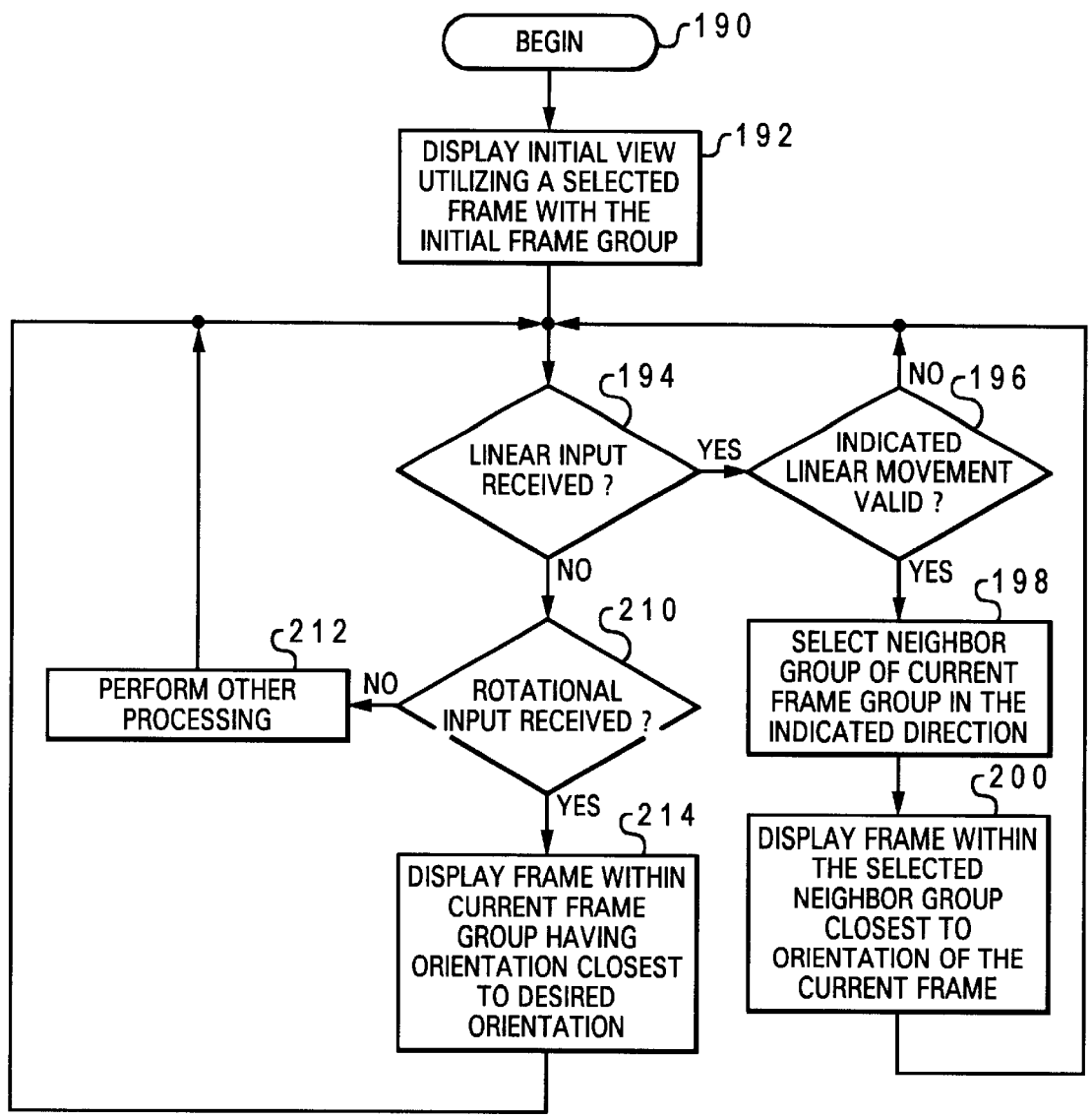
FIG. 8 is a high level logical flowchart of a method for presenting a virtual reality environment described by a presentation data structure.

Once presentation data structure 180 has been constructed, a 3-D simulation of the interior of building 100 can be presented according to the exemplary method depicted in FIG. 8. As with the process shown in FIG. 6, the method of presentation depicted in FIG. 8 may be performed by computer system 6 under the direction of program instructions.

As illustrated, the process begins at block 190, for example, in response to user invocation of a simulation application or in response to conclusion of the process illustrated in FIG. 6. The process then proceeds to block 192, which depicts computer system 6 displaying within display 18 or within the lens of a pair of virtual reality goggles a selected initial frame within an initial frame group. For example, for data structure 180 of FIG. 7, a selected initial frame within frame group A is displayed, giving the user a simulated view into central hall 102 of building 100 from the outside. Following block 192, computer system 6 continues displaying a current frame until the user (or alternatively the system) supplies an input indicating a desired movement within the virtual reality environment. A user can supply inputs indicative of a desired movement via one or more of input devices 20, 22, and 28 or a specialized virtual reality input device.

If a determination is made at block 194 that an input requesting linear movement has been received, the process passes to block 196, which illustrates determining if the simulated movement indicated by the linear input is a valid movement at the current simulated position. The determination shown at block 196 is made by interrogating the presentation data structure to ascertain whether a new simulated position that would result from the requested movement falls within a linear granule of a neighbor group of the current frame group. As illustrated in FIGS. 7 and 9, the forward direction of motion is valid from any current simulated position within the exemplary virtual reality environment, and backing up is permitted at any current simulated position other than simulated position A. Additional valid linear movement choices besides forward and backing up are available at simulated positions B, D, F, H, and J. If the simulated linear motion requested by the linear input is not valid, the linear input is ignored, and the process returns to block 194. If, on the other hand, the simulated linear motion requested by the linear input is valid, the process passes to block 198, which depicts selecting the neighbor group identified at block 196 as the current frame group. In addition, as illustrated at block 200, the frame within the new current frame group having an associated orientation closest to the current frame is displayed in lieu of the current frame, thus replacing it as the current frame. Thereafter, the process returns to block 194.

If instead of a linear input a rotational input is received by the virtual reality presentation system, as indicated by the process passing to block 210 and then to block 214, the current frame group is not updated. Instead, a new current frame is selected for display from among the frames belonging to the current frame group based upon which frame has an associated orientation closest to that indicated by rotational input. Following display of the new current frame, the process returns to block 194. If a received input is neither a linear input nor a rotational input, other processing is performed, as shown at block 212.

The process illustrated in FIG. 8 can be improved by a number of enhancements. For example, an additional window or windows can be utilized to display arrows or other indications of permissible linear and rotational movements from the current simulated position in the virtual reality environment. In addition, conventional image processing techniques may be applied to the contents of the prerecorded frames to derive additional frames that extend the permitted ranges of linear and rotational motion at simulated positions within the virtual reality environment.

As has been described, the present invention provides an automated method and system for producing and presenting a simulation of a real environment. According to the present invention, the simulation is produced from a sequence of spatially related frames containing images of the environment by automatically grouping the frames according to position and logically linking neighboring frame groups to create a presentation data structure. Because the presentation data structure is produced automatically from the spatially related frames, a user capable of recording the constituent images with a camera is able to produce a simulation of the environment without any specialized skills or training. Once the presentation data structure has been produced, a simulation of the environment can be presented by traversing the presentation data structure in response to linear and rotational inputs. Linear changes of position within the virtual reality environment are simulated by displaying a frame within a neighboring frame group that lies in the input-specified direction and is logically linked to the frame group of a current frame. Rotation is simulated within the virtual reality environment by displaying a frame within the frame group of the current frame having a closest orientation to a input-specified orientation.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for execution by a computer system. Programs defining the functions of the present invention can be delivered to the computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. An automated method for providing a simulation of a three-dimensional environment, said method comprising:

in response to identification of a series of recorded frames that each have an associated position and contain an image of a three-dimensional environment, grouping said series of recorded frames into frame groups so that each frame group includes only recorded frames that have closely grouped associated positions; and creating logical links between neighboring frame groups, said logical links being indicative of navigation paths permitted during simulation between positions associated with frame groups thus linked, wherein said creating includes:

identifying each intersecting frame group, if any, for each frame group; and for each frame group, permitting a logical link with only one neighboring frame group within each pair of neighboring frame groups that intersect each other.

2. The method of claim 1, and further comprising:

presenting a simulation of said three-dimensional environment by displaying a recorded frame containing an image of said three-dimensional environment, said displayed record frame belonging to a current frame group; and in response to an input specifying a desired simulated movement within said simulation, displaying a recorded frame from a neighboring frame group of said current frame group.

3. The method of claim 2, wherein:

said recorded frame from said neighboring frame group is displayed in response to an input specifying a desired simulated linear movement; and said method further comprises displaying another recorded frame from said current frame group in response to an input specifying a desired simulated rotational movement.

4. The method of claim 2, wherein said displayed recorded frame has an associated angular orientation and said neighboring frame group includes a plurality of recorded frames, said method further comprising selecting a recorded frame for display from among said plurality of recorded frames within said neighboring frame group that has an associated angular orientation closest to an angular orientation of said displayed record ed frame.

5. The method of claim 1, and further comprising capturing said series of recorded frames utilizing a camera and recording, in association with each of a plurality of recorded frames, at least a relative position of said camera when the associated frame was captured.

6. The method of claim 5, said method further comprising recording, in association with each of said plurality of recorded frames, a relative angular orientation of said camera when the associated frame was captured.

7. A data processing system, comprising:

data processing resources; and data storage that stores environment simulation software, wherein said environment simulation software, in response to receipt by said data processing system of a series of frames that each contain an image of an environment to be simulated and have associated therewith at least a relative position within said environment, groups said series of recorded frames into frame groups so that each frame group includes only recorded frames that have closely grouped associated positions and creates logical links between neighboring frame groups, said logical links being indicative of navigation paths permitted during simulation between positions associated with frame groups thus linked, wherein said environment simulation software creates logical links between neighboring frame groups by identifying each intersecting frame group, if any, for each frame group and, for each frame group, permitting a logical link with only one neighboring frame group within each pair of its neighboring frame groups that intersect each other.

8. The data processing system of claim 7, and further comprising a display and a user input device, wherein said simulation software presents a simulation of said three-dimensional environment by displaying, from a current frame group, a recorded frame containing an image of said three-dimensional environment and, in response to an input specifying a desired simulated movement within said simulation received from said user input device, displaying a recorded frame from a neighboring frame group of said current frame group.

9. The data processing system of claim 8, wherein:
   said recorded frame from said neighboring frame group is displayed in response to an input specifying a desired simulated linear movement; and
   said environment simulation software displays another recorded frame from said current frame group in response to an input specifying a desired simulated rotational movement.

10. The data processing system of claim 8, wherein said displayed recorded frame has an associated angular orientation and said neighboring frame group includes a plurality of recorded frames, wherein said environment selection software selects a recorded frame for display from among said plurality of recorded frames within said neighboring frame group that has an associated angular orientation closest to an angular orientation of said displayed recorded frame.

11. A program product, comprising:
   a data processing usable medium; and
   environment simulation software within said data processing system usable medium, wherein said environment simulation software, in response to receipt of a series of frames that each contain an image of an environment to be simulated and have associated therewith at least a relative position within said environment, groups said series of recorded frames into frame groups so that each frame group includes only recorded frames that have closely grouped associated positions and creates logical links between neighboring frame groups, said logical links being indicative of navigation paths permitted during simulation between positions associated with frame groups thus linked, wherein said environment simulation software creates logical links between neighboring frame groups by identifying each intersecting frame group, if any, for each frame group and, for each frame group, permitting a logical link with only one neighboring frame group within each pair of its intersecting neighboring frame groups.

12. The program product of claim 11, wherein said simulation software presents a simulation of said three-dimensional environment by displaying, from a current frame group, a recorded frame containing an image of said three-dimensional environment and, in response to an input specifying a desired simulated movement within said simulation received from said user input device, displaying a recorded frame from a neighboring frame group of said current frame group.

13. The program product of claim 12, wherein:
   said recorded frame from said neighboring frame group is displayed in response to an input specifying a desired simulated linear movement; and
   said environment simulation software displays another recorded frame from said current frame group in response to an input specifying a desired simulated rotational movement.

14. The program product of claim 11, wherein said displayed recorded frame has an associated angular orientation and said neighboring frame group includes a plurality of recorded frames, wherein said environment selection software selects a recorded frame for display from among said plurality of recorded frames within said neighboring frame group that has an associated angular orientation closest to an angular orientation of said displayed recorded frame.

* * * * *

UNITED STATES PATENT AND TRADEMARK OFFICE
CERTIFICATE OF CORRECTION

PATENT NO. : 6,337,688 B1
DATED : January 8, 2002
INVENTOR(S) : Berstis

It is certified that error appears in the above-identified patent and that said Letters Patent is hereby corrected as shown below:

Column 5,
Line 26, delete the "$((0_x, 0_y, 0_z)$" and replace it with -- $((\theta_x, \theta_y, \theta_z)$ --.

Column 10,
Line 44, delete the words "record ed" and replace them with the word -- recorded --.

Signed and Sealed this

Seventh Day of May, 2002

Attest:

Attesting Officer

JAMES E. ROGAN
Director of the United States Patent and Trademark Office